(12) United States Patent
Kim et al.

(10) Patent No.: US 11,846,368 B2
(45) Date of Patent: Dec. 19, 2023

(54) HYDRAULIC PILOT VALVE

(71) Applicant: YOUNG DONG TECH CO., LTD., Changwon-si (KR)

(72) Inventors: Hee Chul Kim, Changwon-si (KR); Dong Kun Lee, Gimhae-si (KR); Chanheon Yoon, Changwon-si (KR)

(73) Assignee: YOUNG DONG TECH CO., LTD., Changwon-si (KR)

( * ) Notice: Subject to any disclaimer, the term of this patent is extended or adjusted under 35 U.S.C. 154(b) by 39 days.

(21) Appl. No.: 17/850,448

(22) Filed: Jun. 27, 2022

(65) Prior Publication Data

US 2023/0058350 A1 Feb. 23, 2023

(30) Foreign Application Priority Data

Aug. 20, 2021 (KR) .................. 10-2021-0110119

(51) Int. Cl.
*F16K 47/02* (2006.01)
*F15B 13/02* (2006.01)
*F16K 31/363* (2006.01)
*E02F 9/22* (2006.01)

(52) U.S. Cl.
CPC ........... *F16K 47/023* (2013.01); *F15B 13/02* (2013.01); *F16K 31/363* (2013.01); *E02F 9/2267* (2013.01); *E02F 9/2285* (2013.01)

(58) Field of Classification Search
CPC ......... Y10T 137/8723; Y10T 137/8671; Y10T 137/87064; F16K 47/023; F16K 31/363; F15B 13/0422; F15B 13/02; E02F 9/2267; E02F 9/2285
See application file for complete search history.

(56) References Cited

U.S. PATENT DOCUMENTS

| 5,251,660 A * | 10/1993 | Hori .................. F15B 13/0422 137/596.1 |
| 5,433,249 A * | 7/1995 | Tsubota ............. F15B 13/0422 137/625.68 |
| 5,566,716 A * | 10/1996 | Togashi ............. F15B 13/0422 137/596.1 |
| 5,823,227 A * | 10/1998 | Hori .................. F15B 13/0422 137/596.1 |
| 6,125,886 A * | 10/2000 | Sagawa .............. F15B 13/0422 137/596.1 |
| 8,991,429 B2 * | 3/2015 | Yoshimoto ............ G05G 9/047 137/636.1 |

FOREIGN PATENT DOCUMENTS

| FR | 2237076 A1 * | 2/1975 |
| KR | 10-2008-0006793 A | 1/2008 |
| KR | 10-2012-0079559 A | 7/2012 |
| KR | 10-1998308 B1 | 7/2019 |

OTHER PUBLICATIONS

Korean Office Action for related KR Application No. 10-2021-0110119 dated Oct. 8, 2021 from Korean Intellectual Property Office.

* cited by examiner

*Primary Examiner* — Jessica Cahill
(74) *Attorney, Agent, or Firm* — Paratus Law Group, PLLC

(57) ABSTRACT

Disclosed is a hydraulic pilot valve which is provided with an orifice so as to reduce vibration of a valve and minimize impact applied to a valve even when a valve is suddenly operated. At least some of hydraulic oil supplied to a supply chamber flows to a valve chamber or a central pipeline through a damping unit according to elevation of a spool.

5 Claims, 9 Drawing Sheets

HYDRAULIC PILOT VALVE

CROSS-REFERENCE TO RELATED APPLICATION

This application claims priority to Korean Patent Application No. 10-2021-0110119 (filed on Aug. 20, 2021), which is hereby incorporated by reference in its entirety.

BACKGROUND

The present invention relates to a hydraulic pilot valve and, more specifically, to a hydraulic pilot valve which is provided with an orifice so as to reduce vibration of a valve and minimize impact applied to a valve even when a valve is suddenly operated.

In general, a hydraulic valve operated by a joystick is widely used in construction heavy equipment, such as an excavator or a rod, and an actuator for driving a working machine, such as a boom or a bucket, is operated in response to a signal pressure generated by operating a spool according to a driver's joystick manipulation. For example, Korean Patent No. 10-1998308 (Jul. 9, 2019) discloses a flow control system of an electronic hydraulic valve for construction equipment.

On the other hand, a joystick valve is configured in such a way that hydraulic oil is discharged to the corresponding port (supply port) when a force descending to the piston rod is applied by a lever and a spool is pressed down and opened by the piston rod due to the descending force. Moreover, when the hydraulic oil is discharged to the corresponding port, for example, a boom of the rod is expanded or a bucket of an excavator is operated.

However, in the conventional art, as pressure of the hydraulic oil rapidly rises during a sudden operation of the lever, vibration is generated and a response to the operation of the lever gets non-uniform, and it makes precise control impossible.

In addition, in the conventional art, a pipe is formed inside the spool to implement a damping function, and so, it takes lots of time and expenses to process the pipe of the spool.

Furthermore, in the conventional art, defects frequently occur, for instance, it takes lots of time and expenses to manufacture and assemble parts of a valve body, and flow passages are not parallel to each other when the flow passages respectively corresponding to the parts of the three-piece or two-piece type valve body are manufactured. Therefore, recently, development of technology to manufacture an integral valve body and implement a damping function suitable for the integral valve body is being demanded.

Patent Documents

Patent Document 1: Korean Patent No. 10-1998308 (Jul. 9, 2019)

SUMMARY

Accordingly, the present invention has been made in view of the above-mentioned problems occurring in the prior art, and it is an object of the present invention to provide a hydraulic pilot valve capable of minimizing impact applied to a valve and reducing vibration of a valve even in a sudden operation of a valve by implementing a damping function suitable for an integrated valve.

Technical objects to be achieved by the present invention are not limited to the above-described objects and other technical objects that have not been described will be evidently understood by those skilled in the art from the following description.

To accomplish the above object, according to the present invention, there is provided a hydraulic pilot valve including: a valve body; a return chamber formed inside the valve body; a central pipeline extended from the lower part of the return chamber to the bottom surface of the valve body; a return port formed on one side of the bottom surface of the valve body; an auxiliary pipeline extended from the lower side of the central pipeline to the return port; a supply chamber which is formed in the lower part of the return chamber and has a space in which hydraulic oil is stored; a supply port formed on the other side of the bottom surface of the valve body; a bush mounted to surround at least a part of the central pipeline; at least one spool which is inserted into the valve body to be lifted up and down and to control a flow of the hydraulic oil; at least one spool hole into which the spool is inserted to form a space for guiding elevation of the spool, which communicates with the return chamber, and which is communicated with or blocked from the supply chamber by the elevation of the spool; at least one valve chamber communicating with the spool hole and formed at the lower part of the spool hole; and a damping unit formed on one side of the valve chamber to communicate an area of the valve chamber and the central pipeline with each other, wherein at least some of the hydraulic oil supplied to the supply chamber flows to the valve chamber or the central pipeline through the damping unit according to the elevation of the spool.

Moreover, the central pipe includes an auxiliary chamber which is formed in the lower part of the central pipeline and communicates with the central pipeline and the auxiliary pipeline, and the damping unit includes at least one valve orifice communicating the auxiliary chamber and the valve chamber with each other.

Furthermore, the damping unit includes a pin part provided at a lower part of the bush. The pin part includes: a pin main body; a pin pipeline formed inside the pin main body to communicate with the central pipe; and a closing member provided at a lower part of the pin main body to close an end of the central pipeline.

Additionally, the pin pipeline includes: a main pipeline formed in the longitudinal direction of the pin main body; and a subsidiary pipeline formed to communicate with the main pipe. The subsidiary pipe communicates with the auxiliary pipeline, and the damping unit includes at least one pin orifice communicating the valve chamber with the main pipeline.

In addition, the pin pipeline includes: a main pipeline formed in the longitudinal direction of the pin main body; and at least one subsidiary pipeline formed to communicate with the main pipeline, and the subsidiary pipeline communicates with the auxiliary pipeline. Additionally, the pin main body includes a groove formed along the outer circumferential surface of the pin main body, and the groove communicates with the valve chamber.

As described above, according to a preferred embodiment of the present invention, the hydraulic pilot valve can reduce vibration of a valve and minimize impact applied to a valve even when a valve is suddenly operated.

More specifically, the hydraulic pilot valve according to the present invention is provided with a damping unit so as to minimize vibration or noise of the working machine caused by the sudden falling of the spool, thereby enabling more precise control and reducing the risk of safety accidents.

Additionally, the hydraulic pilot valve according to the present invention can reduce time and expenses required for processing the inside of the valve body by integrally processing the valve chamber.

In addition, the hydraulic pilot valve of the present invention can reduce the amount of chips generated by processing the inside of the valve body and minimize accumulation of chips inside the valve body by reducing the amount of chips generated by processing the inside of the valve body.

Moreover, the hydraulic pilot valve according to the present invention can facilitate a flow of hydraulic oil so as to minimize malfunction due to foreign substances, such as worn residues, since the auxiliary chamber is formed to communicate with the return chamber and the return port.

In addition, the hydraulic pilot valve according to the present invention can continuously provide damping effect by maintaining the state in which hydraulic oil required for the damping effect is always stored in the groove.

The advantages of the present disclosure are not limited to the above-mentioned advantages, and other advantages, which are not specifically mentioned herein, will be clearly understood by those skilled in the art from the following description.

BRIEF DESCRIPTION OF THE DRAWINGS

The above and other objects, features and advantages of the present invention will be apparent from the following detailed description of the preferred embodiments of the invention in conjunction with the accompanying drawings, in which.

DETAILED DESCRIPTION

Figure 1:
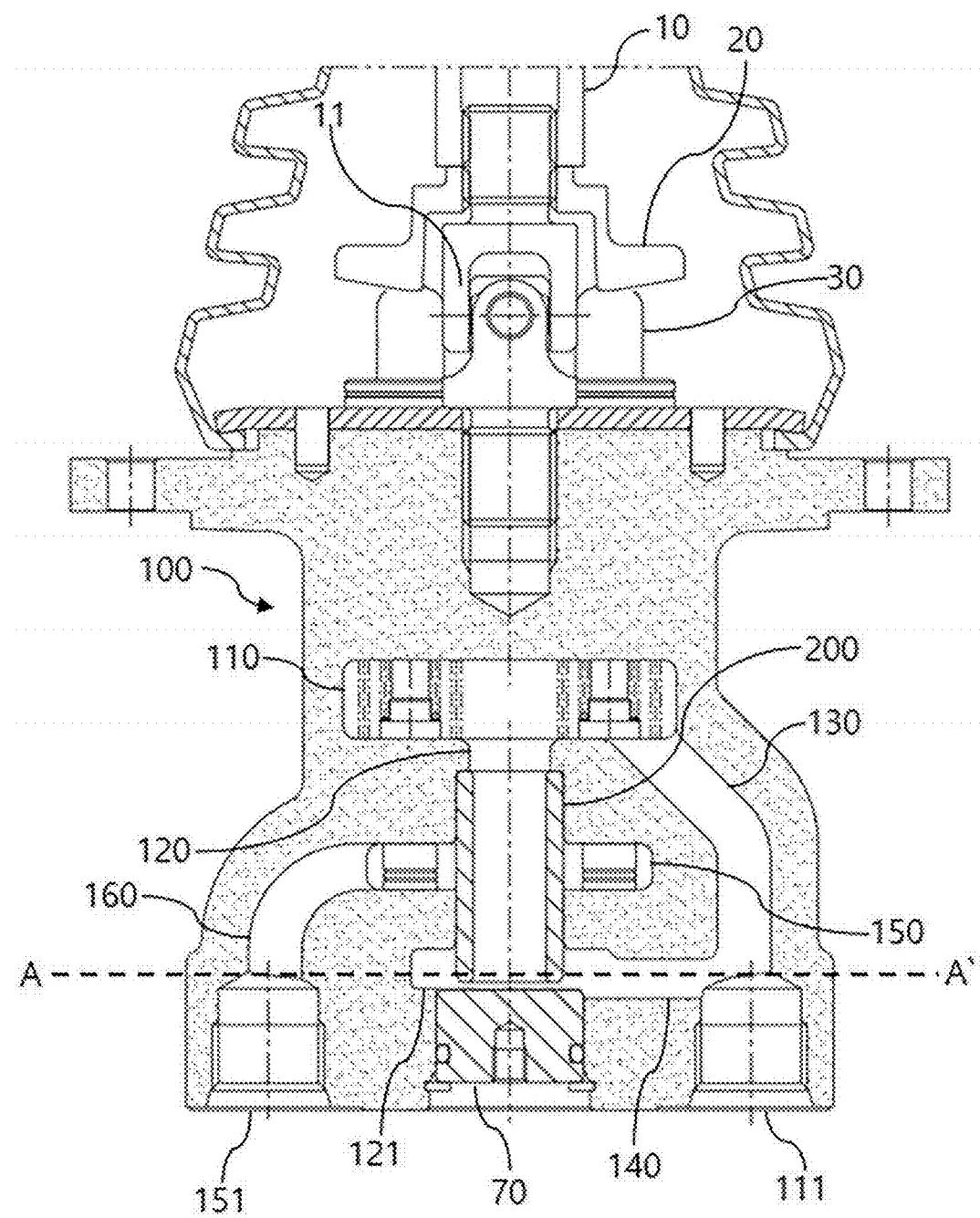
FIG. 1 is a longitudinal cross-sectional view of a hydraulic pilot valve according to a first embodiment of the present invention.

Terms used in this specification will be described in brief, and the present invention will be described in detail.

The terms including descriptive or technical terms which are used herein should be construed as having meanings that are obvious to one of ordinary skill in the art. However, the terms may have different meanings according to an intention of one of ordinary skill in the art, precedent cases, or the appearance of new technologies. Also, some terms may be arbitrarily selected by the applicant, and in this case, the meaning of the selected terms will be described in detail in the detailed description of the invention. Thus, the terms used herein have to be defined based on the meaning of the terms together with the description throughout the specification.

Also, when a part "includes" or "comprises" a component, unless there is a particular description contrary thereto, the part can further include other components, not excluding the other components.

Hereinafter, with reference to the accompanying drawings, the present invention will be described in detail so that those skilled in the art can execute easily. However, embodiments of the present invention may be implemented in several different forms and are not limited to the embodiments described herein.

Specific matters including objects of the present invention, solving means for the objects, and effects of the present invention are included in the detailed description and drawings of the present invention. Advantages and features of the present disclosure and methods accomplishing the advantages and features will become apparent from the following detailed description of exemplary embodiments with reference to the accompanying drawings.

Hereinafter, preferred embodiments of the present disclosure will be described in detail with reference to the accompanying drawings.

First, a lever 10 manipulated by a worker's hand is connected to a valve body 100, which will be described later, as a universal joint 11, four push rods 30 are arranged on the upper side of the valve body 100 to protrude. When the worker manipulates the lever 10, a disc 20 presses at least one among the four push rods 30 inserted into a plug 40, and then, a spool 300 connected when the disc 20 presses one of the push rods 30 descends. Hydraulic fluid acts as a signal pressure while being supplied to an actuator through an actuator port 311, which will be described later, by descent of the spool 300. That is, the hydraulic oil generates an actuator driving signal pressure for driving a working machine (not shown), such as a boom or a bucket of an excavator. At the same time, the hydraulic oil supplied to another actuator is drained to the inside of the valve body 100, which will be described later, and then, is discharged through a return port 111, which will be described later. After that, when the worker releases the lever 10 to the original position, the spool 300, the push rod 30, and the plug 40 are located at the original positions by elasticity of a spring seat 50 and a spring 60. The configuration of such a joystick valve is approximately the same as that of the prior art, and thus, a detailed description thereof will be omitted.

Figure 2:
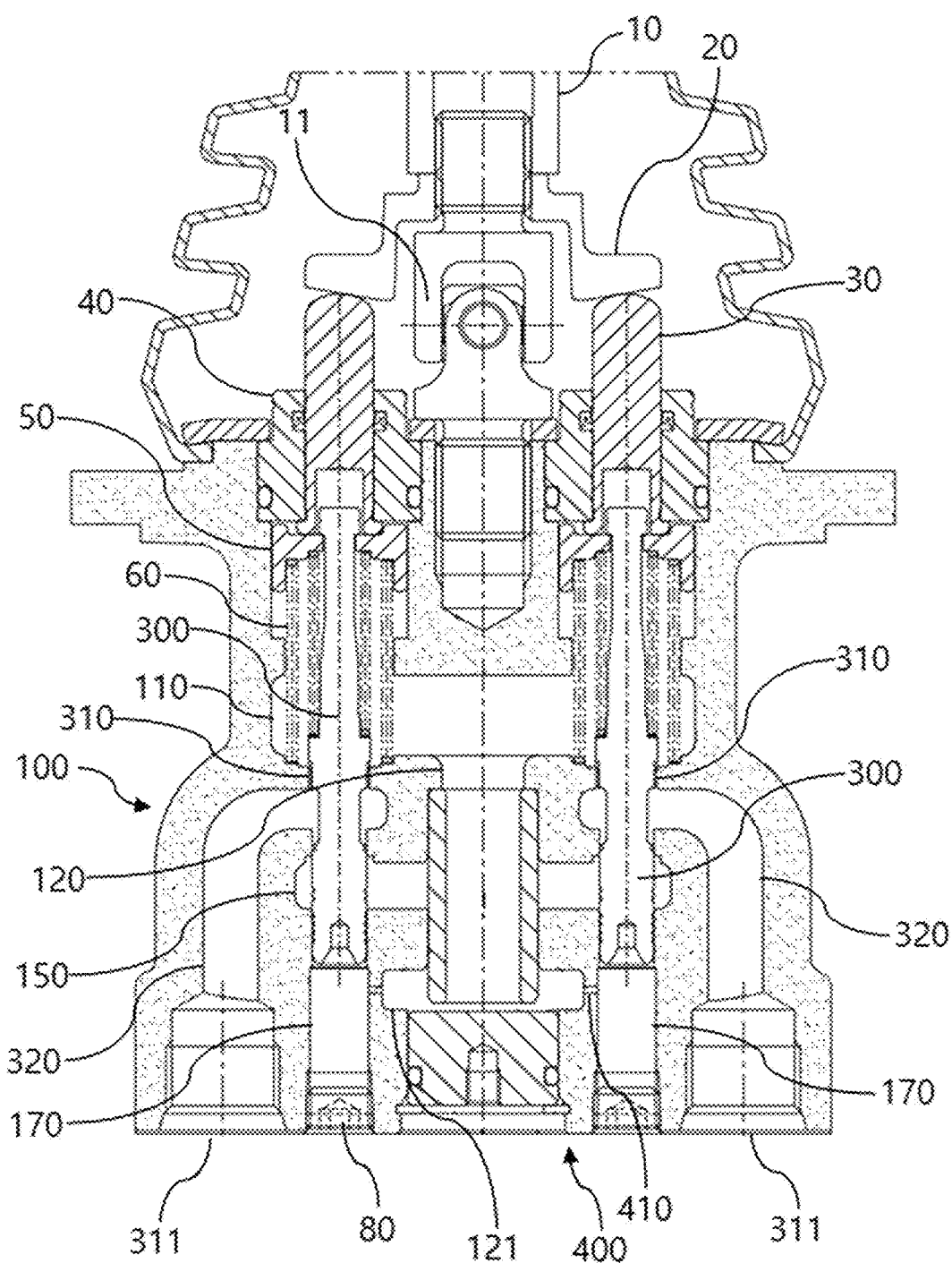
FIG. 2 is a longitudinal cross-sectional view of the hydraulic pilot valve according to the first embodiment of the present invention in a different direction.
Figure 3:
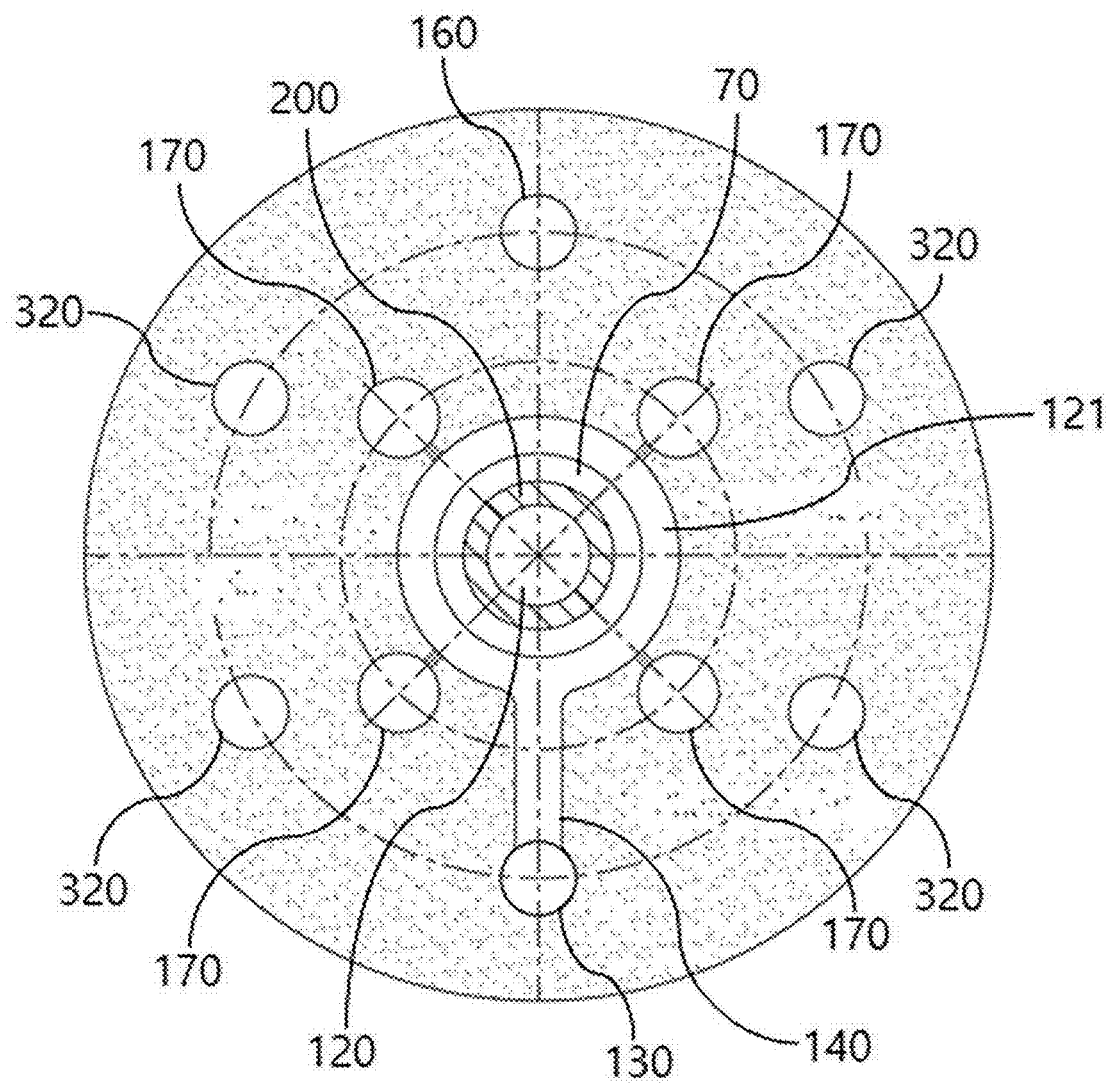
FIG. 3 is a cross-sectional view illustrating the hydraulic pilot valve according to the first embodiment of the present invention, and taken along the dotted line A-A' of FIG. 1.

Referring to FIGS. 1 and 2, a hydraulic pilot valve according to a first preferred embodiment of the present invention includes: a valve body 100; a return chamber 110 formed inside the valve body 100; a central pipeline 120 extended from the lower part of the return chamber 110 to the bottom surface of the valve body 100; a return port 111 formed on one side of the bottom surface of the valve body 100; a return pipeline 130 extended from one side of the return chamber 110 to the return port 111; an auxiliary pipeline 140 extended from the lower side of the central pipeline 120 to the return port 111; a supply chamber 150 which is formed in the lower part of the return chamber 110 and has a space in which hydraulic oil is stored; a supply port 151 formed on the other side of the bottom surface of the valve body 100; a supply pipeline 160 extended from one side of the supply chamber 150 to the supply port 151; a bush 200 mounted to surround at least a part of the central pipeline 120; at least one spool 300 which is inserted into the valve body 100 to be lifted up and down and to control a flow of the hydraulic oil; at least one spool hole 310 into which the spool 300 is inserted to form a space for guiding elevation of the spool 300, which communicates with the return chamber 110, and which is communicated with or blocked from the supply chamber 150 by the elevation of the spool 300; at least one actuator port 311 formed on the bottom surface of the valve body 100; at least one actuator pipeline 320 extended from the other side of the supply chamber 150 to the actuator port 311; at least one valve chamber 170 communicating with the spool hole 310 and formed at the lower part of the spool hole 310; and a damping unit 400 formed on one side of the valve chamber 170 to communicate an area of the valve chamber 170 and the central pipeline 120 with each other. At least some of the hydraulic oil supplied to the supply chamber 150 flows to the valve chamber 170 or the central pipeline 120 through the damping unit 400 according to the elevation of the spool 300.

First, the valve body 100 is provided. The valve body 100 according to an embodiment of the present invention is integrally manufactured and is formed in a bell shape of which the lower part is wider than the upper part so as to be stably mounted on the ground. Here, the inside of the valve body 100 has components, which will be described later, by processing, serves as a valve when the spool 300, the bush 200, the pin 70, and the pin part 420 are inserted thereinto. The inside of the valve body 100 is integrally manufactured.

Next, the return chamber 110 is provided. The return chamber 110 is formed long in a direction perpendicular to the longitudinal direction of the valve body 100 at the center of the valve body 100. In this instance, the return chamber 110 has a space in which the hydraulic oil can flow or is stored, and the right lower end of the return chamber 110 is formed to communicate with the return pipeline 130. Therefore, the hydraulic oil flowing into the return chamber 110 is discharged through the return port 111 along the return pipeline 130. In this instance, a storage tank (not shown) provided to be spaced apart from the valve body 100 is connected to the return port 111 by a hose (not shown), and the hydraulic oil in the return chamber 110 flows to the storage tank.

Next, the central pipeline 120 is provided. The central pipeline 120 is formed long in the longitudinal direction of the valve body 100, and is connected to the central lower part of the return chamber 110. In other words, the central pipeline 120 extends from the bottom surface of the center of the valve body 100 to the lower side of the center of the return chamber 110. Here, the lower end of the central pipeline 120 is open. In order to prevent the hydraulic oil in the return chamber 110 from being discharged to the outside along the central pipeline 120, a pin 70 is provided at the lower end of the central pipeline 120. In other words, the upper end of the central pipeline 120 is communicated with the central portion of the lower side of the return chamber 110, and the lower end part of the central pipeline 120 is opened to the outside or is closed by a pin 70 to prevent the hydraulic oil from being discharged to the lower end of the central pipeline 120.

In addition, the central pipeline 120 is differentiated from the supply pipe 160 by the bush 200. In other words, the central pipeline 120 is manufactured in such a way that both sides of the central portion of the central pipeline 120 communicate with the supply pipe 160. In order to prevent the hydraulic oil supplied through the supply pipeline 160 from flowing to the central pipeline 120, the bush 200 is provided at the central portion of the central pipeline 120. That is, the bush 200 is provided to surround at least a part of the central pipeline 120.

Next, the return pipeline 130 is provided. The return pipeline 130 extends from the lower end of the right side of the return chamber 110 to the return port 111. In this instance, the return pipeline 130 communicates with the return chamber 110, is formed in the longitudinal direction of the valve body 100, and has a shape corresponding to the outer circumferential surface of the valve body 100. In other words, the return pipeline 130 extends downward from the lower end of the right side of the return chamber 110 to the outside of the valve body 100 to be inclined, and then, the central portion extends in parallel to the longitudinal direction of the valve body 100. Therefore, when the hydraulic oil in the return chamber 110 flows to the return pipeline 130, it is prevented that the flow rate of the hydraulic oil rapidly increases.

Next, the supply chamber 150 is provided. The supply chamber 150 is formed below the return chamber 110 to have a shape corresponding to the return chamber 110. That is, the supply chamber 150 is formed directly beneath the return chamber 110 to be spaced apart from the return chamber 110, and is formed long to be perpendicular to the longitudinal direction of the valve body 100. In this instance, the supply chamber 150 has a space in which the hydraulic oil flows or is stored, and the left side of the supply chamber 150 is formed to communicate with the supply pipe 160. Here, the volume of the inner space of the supply chamber 150 is smaller than that of the inner space of the return chamber 110. Therefore, the hydraulic oil supplied through the supply port 151 is stored in the supply chamber 150 along the supply pipe 160. In this instance, a pump (not shown) provided to be spaced apart from the valve body 100 is communicated by the supply port 151 and a hose (not shown), and the hydraulic fluid flows to the supply chamber 150 by the pump.

Next, the spool 300 is provided. In one example, there are four spools 300 which are radially arranged by being spaced apart from the central pipeline 120 around the central pipeline 120. Furthermore, the four spools 300 are respectively lifted by the worker's manipulation of the lever 10. When the spool 300 descends, the spool hole 310 and the supply chamber 150 communicate with each other so that the hydraulic oil in the supply chamber 150 flows into the spool hole 310, and then, is supplied to the working machine through the actuator port 311. Here, the spool 300 has a concave groove on the outer circumferential surface to form a small diameter, and the concave groove gets adjacent to the supply chamber 150 while the spool 300 lowers, so that the spool hole 310 and the supply chamber 150 are communicated with each other. Since the spool has approximately the same configuration as the conventional art, a detailed description thereof is omitted.

In this instance, an oil groove can be formed on the outer circumferential surface of the spool 300, and hydraulic oil is supplied to the oil groove to perform a lubrication function of the spool 300. In addition, the hydraulic oil of the oil groove can minimize inclination or rotation of the spool 300 even when the spool 300 is lifted. That is, since the hydraulic oil supplied to the oil groove fills up a gap between the spool 300 and the valve chamber 170 to maintain an interval between the spool 300 and the valve chamber 170 so that the spool 300 maintains the parallel state.

In this instance, at least some of the hydraulic oil flowing through the supply chamber 150 can be supplied to the oil groove, and at least some of the hydraulic oil flowing through the central pipeline 120 is supplied to the valve chamber 170 through the damping unit 400.

Next, the spool hole 310 is provided. The spool 300 is inserted into the spool hole 310, and the spool hole 310 has a space for guiding the elevation of the spool 300. Here, the four spool holes 310 are radially formed by being separated from the central pipeline 120 around the central pipeline 120.

Moreover, there are four actuator ports 311 on the bottom surface of the valve body 100. The four actuator ports 311 are respectively communicated with the four spool holes 310 by means of four actuator pipelines 320. More specifically, the actuator pipeline 320 is in communication with the spool hole 310, and the communication point is a point spaced apart from the upper portion of the supply chamber 150. In other words, the upper end portion of the actuator pipeline 320 is a side part of the spool hole 310 at a portion spaced apart from the upper portion of the supply chamber 150, and the lower end portion of the actuator pipeline 320 is in communication with the actuator port 311. In this instance, a working machine (not shown) provided to be spaced from the valve body 100 is connected to the actuator port 311 by a hose (not shown) so that the hydraulic oil in the supply chamber 150 passes the spool hole 310 and the actuator pipeline 320 and flows to the working machine through the actuator port 311. Here, the actuator pipeline 320 extends in parallel with the ground from the side of the spool hole 310 toward the outside of the valve body 100, and then, downwardly extends to be vertical to the ground surface so as to communicate with the actuator port 311. Therefore, when the hydraulic oil in the supply chamber 150 flows to the actuator pipeline 320, it is prevented that the flow rate of the hydraulic oil rapidly increases.

Next, the return port 111, the supply port 151, and the four actuator ports 311 can be arranged on the ground surface to be radially spaced from one another around the central pipeline 120. Therefore, the central pipeline 120, the return pipeline 130, the auxiliary pipeline 140, the supply pipe 160, the spool hole 310, and the actuator pipeline 320 can be manufactured to have an appropriate diameter by minimizing interference with one another inside the valve body 100.

Next, the valve chamber 170 is provided. In one example, four valve chambers 170 are respectively formed below the four spool holes 310. In this instance, the lower part of the valve chamber 170 is closed by a plug 80, and the hydraulic oil flowing through the damping unit 400 is stored or moved inside the valve chamber 170. In addition, the inner circumferential surface of the valve chamber 170 is formed to correspond to the outer circumferential surface of the spool 300 so that the spool 300 can be lifted and lowered inside the valve chamber 170.

Next, the damping unit 400 is provided. For example, the damping unit 400 is provided in an upper region of the valve chamber 170 so that the hydraulic oil of the valve chamber 170 can flow to the central pipeline 120 by communicating the upper side of the valve chamber 170 and the side surface of the central pipeline 120 with each other. That is, the hydraulic oil in the valve chamber 170 performs a damping action according to the descent of the spool 300. In other words, the hydraulic fluid performs a buffering action for the spool 300 when the spool 300 descends suddenly, and the hydraulic oil flows from the inside of the valve chamber 170 to the central pipeline 120 according to the pressure in the valve chamber 170. That is, because of the compression of the hydraulic oil and the movement of the hydraulic oil in the valve chamber 170, the present invention can provide a more stabilized operation due to appropriate damping for the elevation of the spool 300 even if there is vibration or a sudden movement. In this instance, the valve chamber 170 and the central pipeline 120 can maintain the communicated state in a state in which the spool 300 is located to the original position by the spring 60, but can be blocked when the spool 300 is lowered.

In this instance, the auxiliary pipeline 140 is formed on the same line as the damping unit 400 so that the hydraulic oil inside the valve chamber 170 can flow to the return port 111 via the central pipeline 120. That is, one end of the auxiliary pipeline 140 is connected to the lower side of the central pipeline 120, which is a point corresponding to the upper side of the valve chamber 170, and the other end of the auxiliary pipeline 140 is connected to the return port 111. Accordingly, the hydraulic oil flowing from the valve chamber 170 to the central pipeline 120 is discharged through the return port 111 along the auxiliary pipeline 140. In other words, the return port 111 is connected to the return pipeline 130 and the auxiliary pipeline 140, and the return pipeline 130 and the auxiliary pipeline 140 can also be connected in the vicinity of the return port 111. Through the above configuration, the hydraulic oil is circulated through the auxiliary pipeline 140 and the return pipeline 130, thereby minimizing that foreign substances in the hydraulic oil are accumulated inside the valve body 100.

Here, referring to FIG. 2, the central pipeline 120 includes an auxiliary chamber 121 formed below the central pipeline 120 and communicating with the central pipeline 120 and the auxiliary pipeline 140, and the damping unit 400 includes at least one valve orifice 410 to communicate the auxiliary chamber 121 with the valve chamber 170.

More specifically, the auxiliary chamber 121 is formed to correspond to the supply chamber 150 under the supply chamber 150. That is, the auxiliary chamber 121 is formed to be spaced apart from the supply chamber 150 under the supply chamber 150, and is formed long to be perpendicular to the longitudinal direction of the valve body 100. In this instance, the auxiliary chamber 121 has a space in which the hydraulic oil flows or is stored, and the right side of the auxiliary chamber 121 is formed to communicate with the auxiliary pipeline 140. Here, the volume of the inner space of the auxiliary chamber 121 is smaller than that of the supply chamber 150. In addition, the auxiliary chamber 121 is formed below the central pipeline 120 and communicates with the central pipeline 120. The valve orifice 410 serves to connect the valve chamber 170 to the auxiliary chamber 121. For instance, there are four valve orifices 410 respectively formed in four valve chambers 170. The hydraulic oil can flow between the valve chamber 170 and the auxiliary chamber 121 according to a pressure change inside the valve chamber 170 due to the elevation of the spool 300.

Here, the inner diameter of the valve orifice 410 may be 0.1 to 0.2 times the inner diameter of the valve chamber 170. In this instance, when the inner diameter of the valve orifice 410 is less than 0.1 times the inner diameter of the valve chamber 170, reactivity (reaction speed) of the hydraulic valve is reduced. Therefore, for example, if it is applied to an excavator, the working speed of the excavator is reduced. Even though the worker controls the excavator, since a response speed with respect to the corresponding control is slow, an incidence rate of safety accidents, such as collision accidents, is increased. Additionally, time and expenses required for manufacturing the valve orifice 410 are increased suddenly, and when internal pressure of the valve chamber 170 rises suddenly, the valve orifice 410 may be damaged. Furthermore, when the inner diameter of the valve orifice 410 is manufactured to exceed 0.2 times the inner diameter of the valve chamber 170, control stability of the hydraulic valve is reduced so that the worker cannot perform precise control by vibration or the like. In addition, damping performance is reduced since the hydraulic oil in the valve chamber 170 flows into the auxiliary chamber 121 even at a small pressure. Therefore, the inner diameter of the valve orifice 410 is 0.1 to 0.2 times the inner diameter of the valve chamber 170.

As a result, when the worker lowers at least one of the four spools 300 by manipulating the lever 10, the spool hole 310 corresponding to the lowered spool 300 communicates with the supply chamber 150. Moreover, the hydraulic oil is supplied to the working machine through the actuator port 311 corresponding to the spool hole 310 after passing through the spool hole 310 due to the operation of the pump. At the same time, in the working machine corresponding to the undescended spool 300 among the four spools 300, through the corresponding actuator port 311, the hydraulic oil is introduced into the return chamber 110 through the corresponding spool hole 310, and then, flows to the storage tank. In such a process, the damping unit 400 minimizes generation of vibration or noise of the working machine due to the sudden descending of the spool 300, thereby enabling more precise control and reducing risks of safety accidents. In addition, the auxiliary chamber 121 is formed to communicate with the return chamber 110 and the return port 111 so as to facilitate the flow of the hydraulic oil, thereby minimizing malfunction by foreign substances such as worn residues.

Hereinafter, a hydraulic pilot valve according to a second embodiment of the present invention will be described in detail with reference to the accompanying drawings. In the present embodiment, there is a difference in that a pin part 420 is provided in comparison with a first embodiment. In the second embodiment, with respect to parts duplicated to the first embodiment, the description of the first embodiment is cited.

Figure 4:
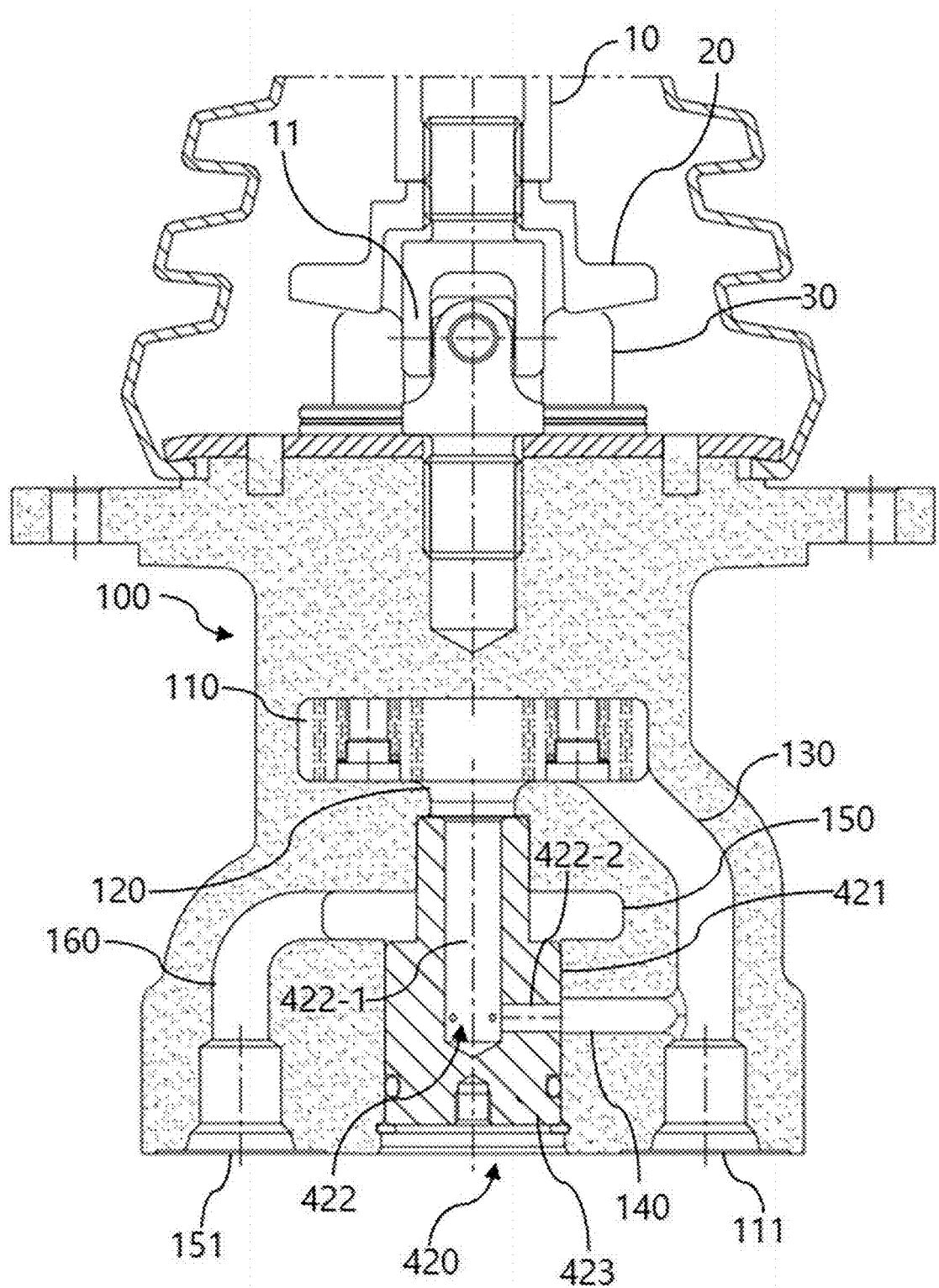
FIG. 4 is a longitudinal cross-sectional view of a hydraulic pilot valve according to a second embodiment of the present invention.
Figure 5:
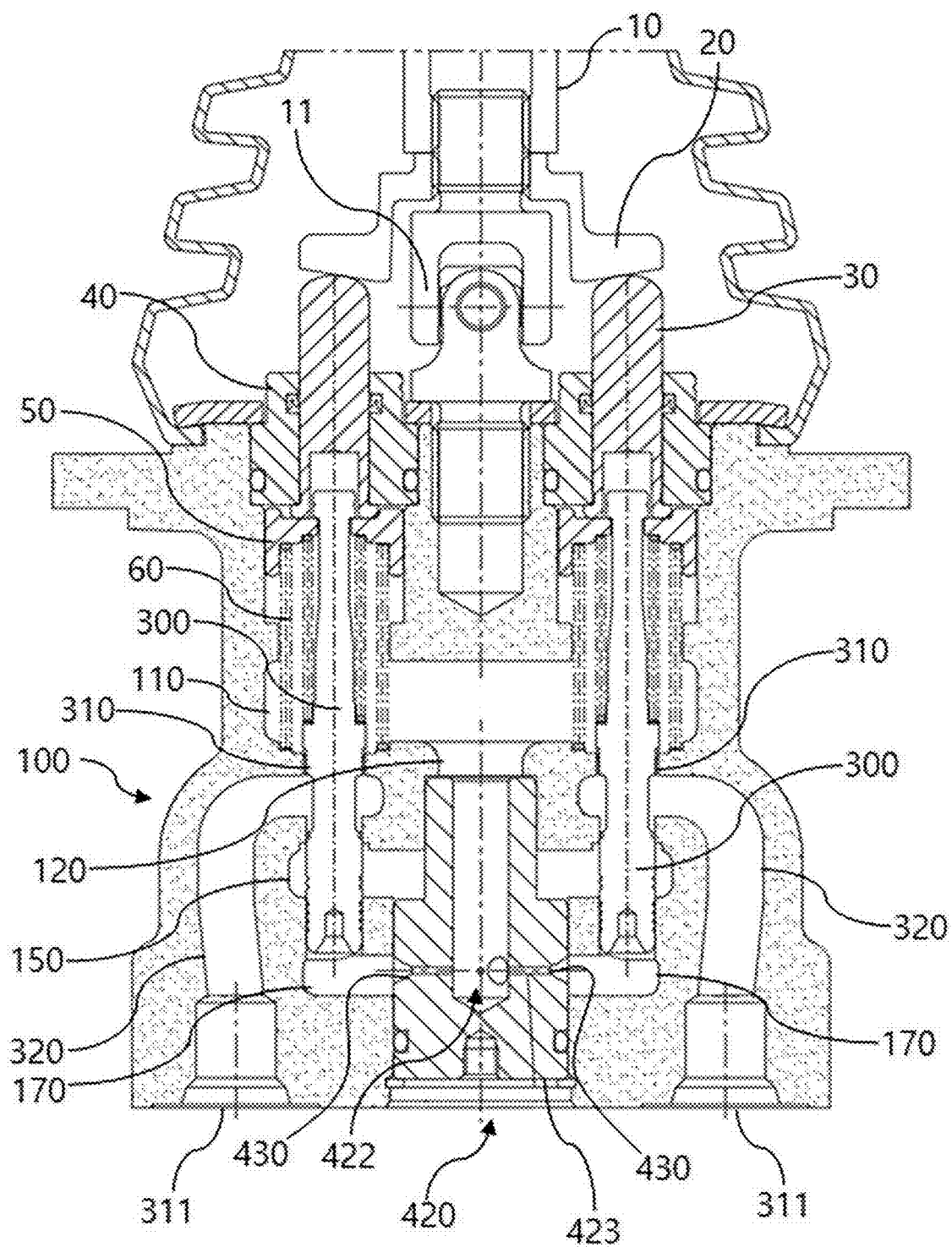
FIG. 5 is a longitudinal cross-sectional view of the hydraulic pilot valve according to the second embodiment of the present invention in a different direction.
Figure 6:
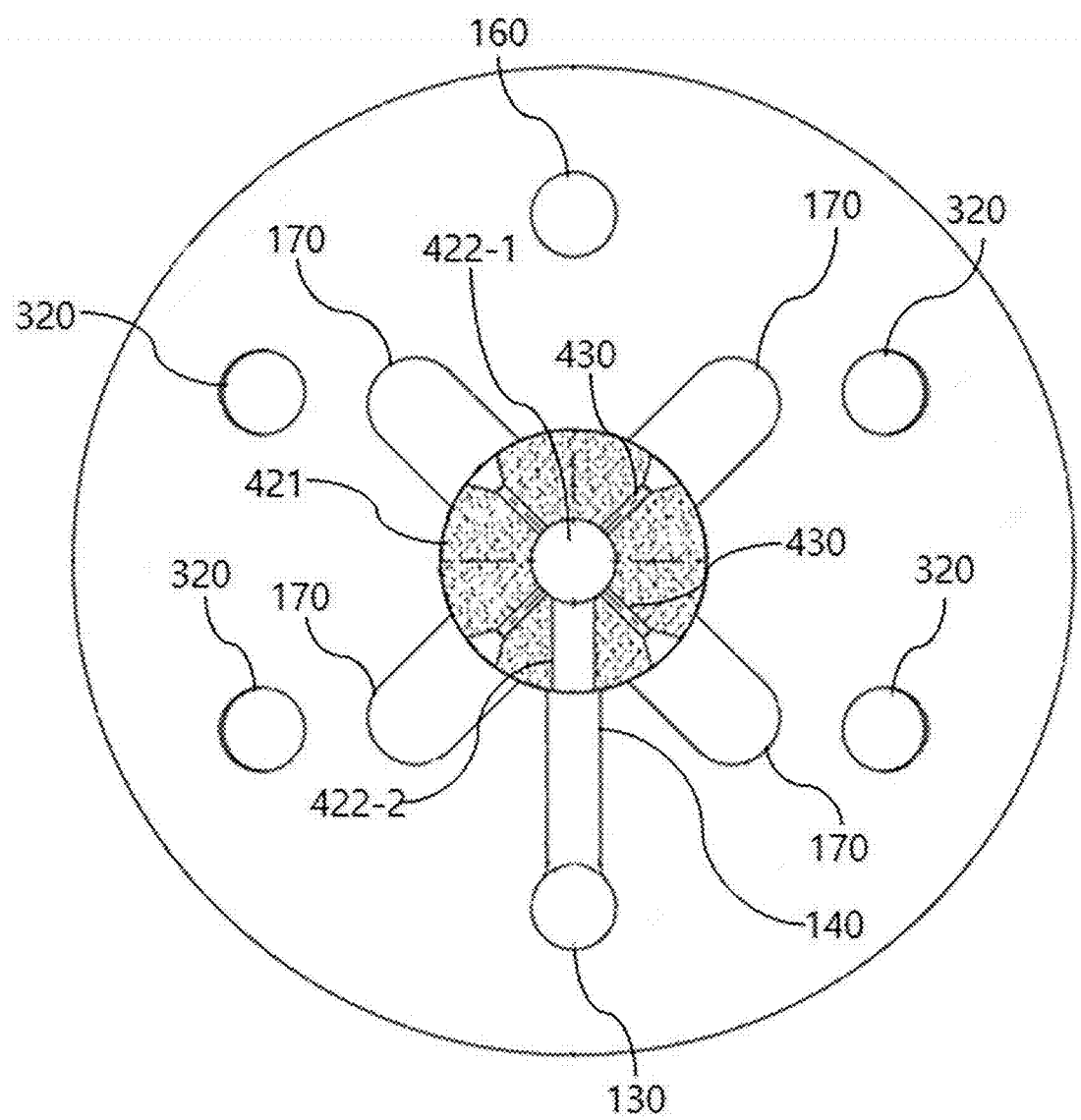
FIG. 6 is a cross-sectional view of FIG. 4 illustrating the hydraulic pilot valve according to the second embodiment of the present invention, and taken along a line corresponding to the dotted line A-A' of FIG. 1.
Figure 7:
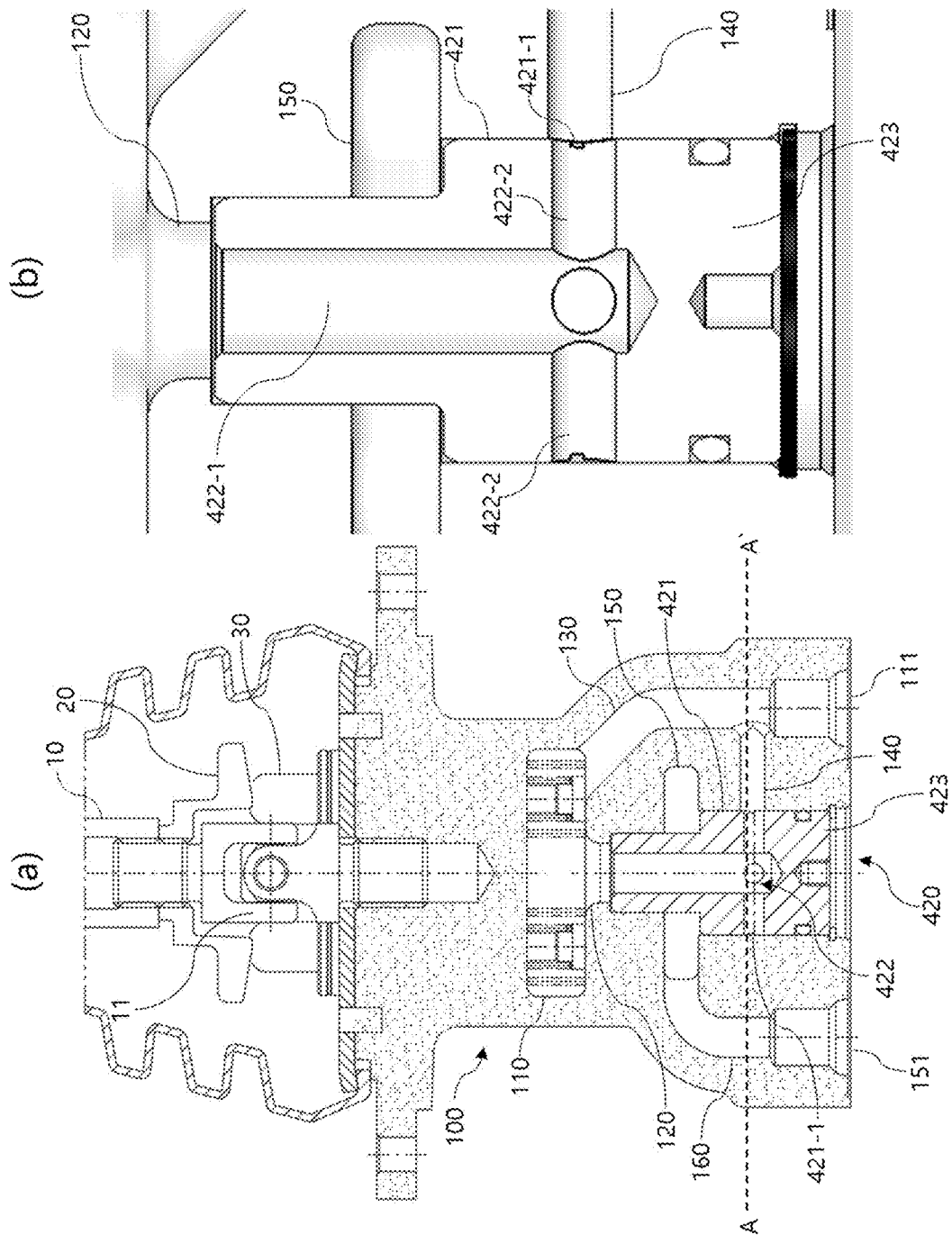
FIG. 7 illustrates (a) a longitudinal sectional view of a hydraulic pilot valve according to a third embodiment of the present invention, and (b) an enlarged view of a groove of (a) of FIG. 7, (a)
Figure 8:
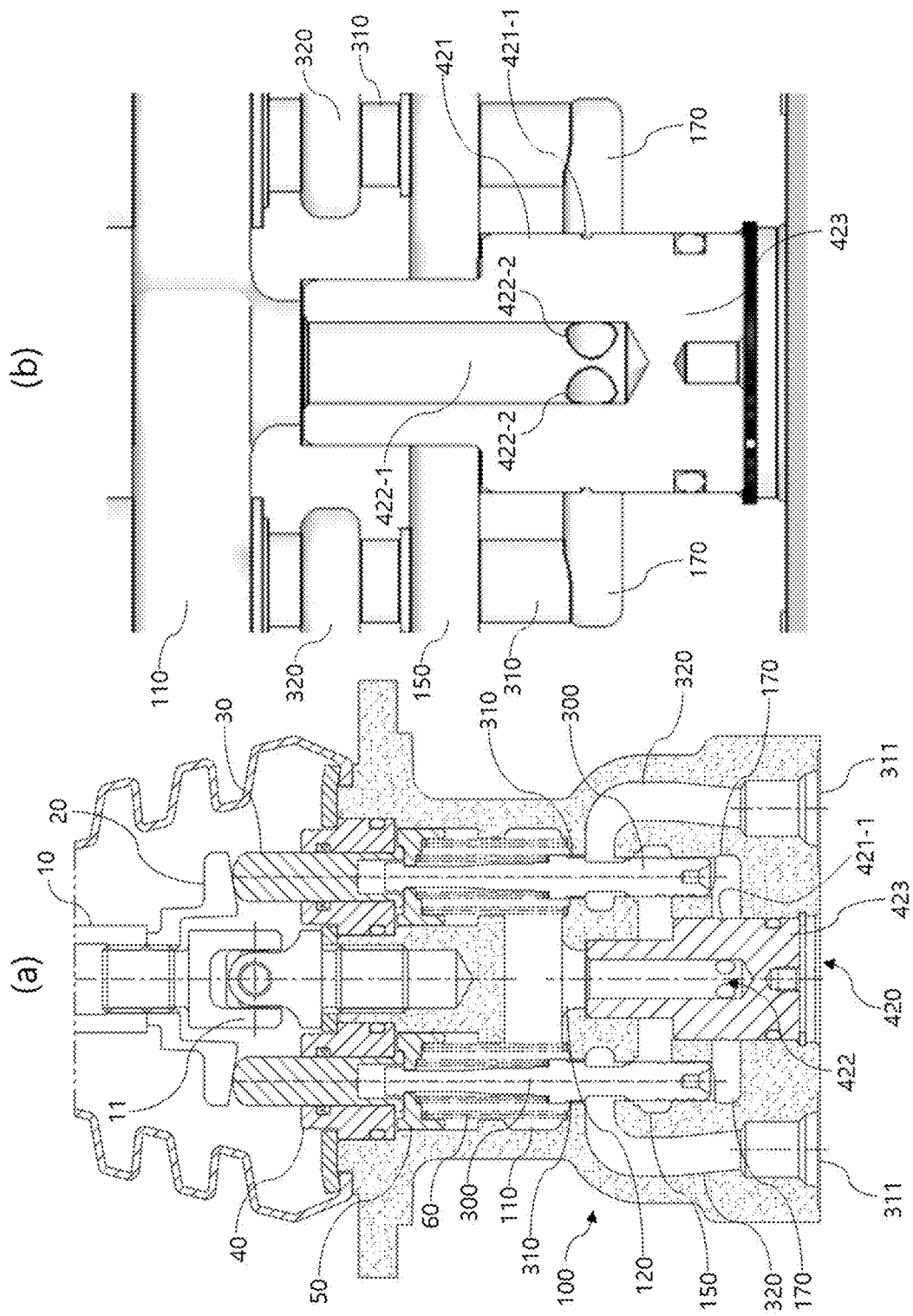
FIG. 8 illustrates (a) a longitudinal sectional view of the hydraulic pilot valve according to the third embodiment of the present invention in a different direction, and (b) an enlarged view of a groove configuration of FIG. 8, (a)
Figure 9:
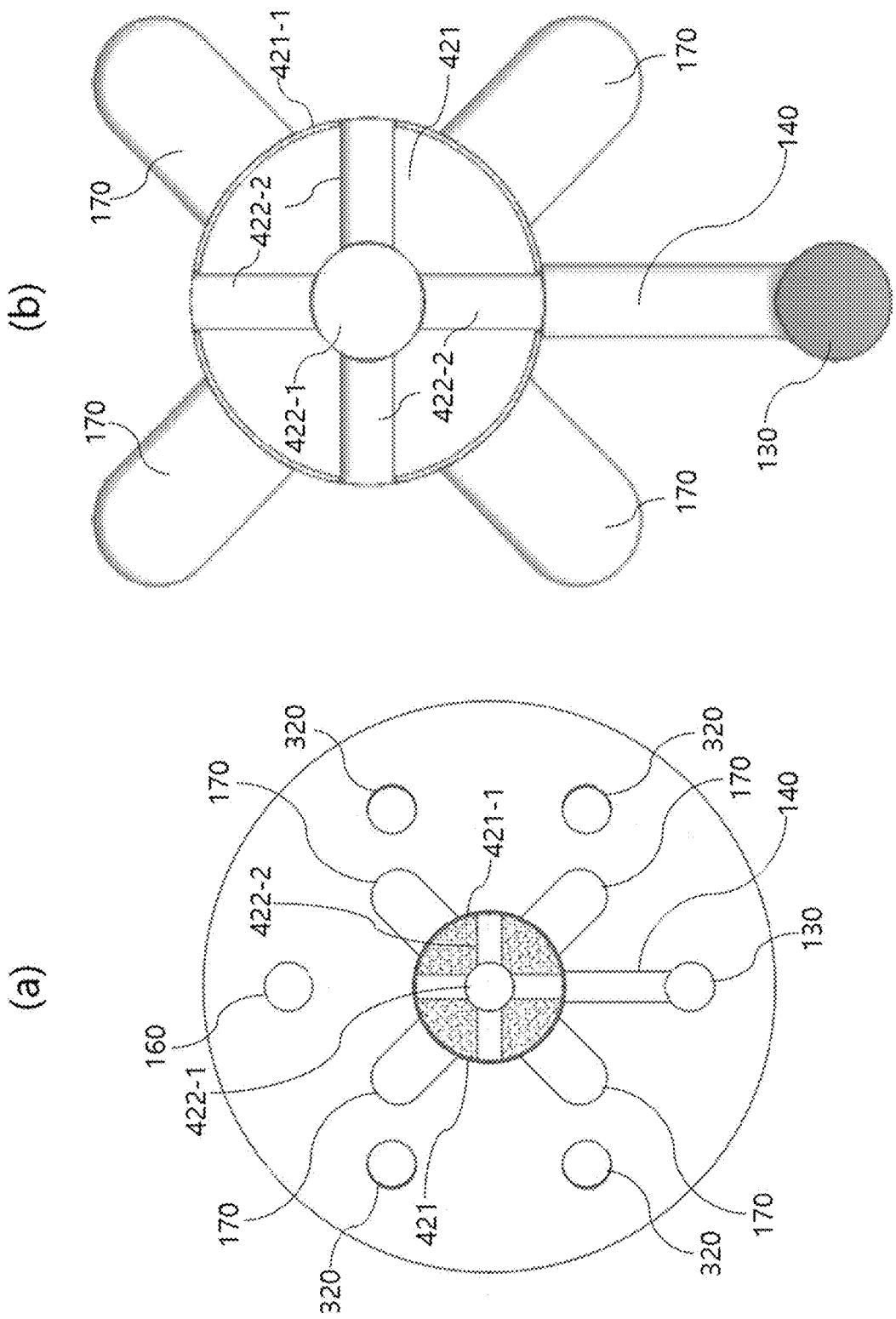
FIG. 9 illustrates (a) a cross-sectional view taken along a line corresponding to the line A-A' of FIG. 7, illustrating the hydraulic pilot valve according to the third embodiment of the present invention, and (b) an enlarged view of a groove configuration of FIG. 9, (a).

Referring to FIGS. 4 to 6, the damping unit 400 includes a pin part 420 provided at the lower part of the bush 200. The pin part 420 includes a pin main body 421, a pin pipeline 422 formed in the pin main body 421 to communicate with the central pipeline 120, and a closing member 423 provided at the lower part of the pin main body 421 to close an end of the central pipeline 120.

More specifically, the pin main body 421 is formed to extend from the lower part of the bush 200 provided to surround the central pipeline 120, and is manufactured to have a diameter larger than the diameter of the bush 200. That is, the pin main body 421 is integrally provided with the bush 200 so that the pin main body 421 is inserted into the valve body 100, thereby serving as the bush 200. In addition, the pin main body 421 is hollow, and the pin pipeline 422 is formed therein. In other words, the pin pipeline 422 communicates with the hollow pipeline 120, and is formed along the longitudinal direction of the valve body 100 from the upper side of the pin main body 421 to the center part of the pin pipeline 422. The closing member 423 extends from the lower part of the pin main body 421 to the bottom surface of the valve body 100. When the pin part 420 is fastened to the valve body 100 via a screw or the like after being inserted into the central pipeline 120, the closing member 423 closes the lower end portion of the central pipeline 120. In other words, the pin part 420 is coupled to the valve body 100 in the state in which the bottom surface of the closing member 423 is parallel to the bottom surface of the valve body 100.

Moreover, the pin pipeline 422 includes a main pipeline 422-1 formed in the longitudinal direction of the pin main body 421, and a subsidiary pipeline 422-2 formed to communicate with the main pipeline 422-1. The subsidiary pipeline 422-2 communicates with the auxiliary pipeline 140, and the damping unit 400 includes at least one pin part orifice 430 for connecting the main pipeline 422-1 to the valve chamber 170.

More specifically, the main pipeline 422-1 communicates with the central pipeline 120, is parallel to the central pipeline 120, and is formed along the longitudinal direction of the valve body 100 from the upper side of the pin main body 421 to the center part of the pin pipeline 422. In addition, the subsidiary pipeline 422-2 is formed perpendicular to the main pipeline 422-1, and one end of the subsidiary pipeline 422-2 communicates with the main pipeline 422-1, and the other end of the subsidiary pipeline 422-2 communicates with the auxiliary pipeline 140. In addition, the subsidiary pipeline 422-2 is formed on the same line as the auxiliary pipeline 140.

Additionally, four pin part orifices 430 are formed perpendicular to the main pipeline 422-1 and around the main pipeline 422-1. In this instance, the pin part orifice 430 is radially formed with respect to the center of the main pipeline 422-1. One end of the pin part orifice 430 communicates with the main pipeline 422-1, and the other end of the pin part orifice 430 communicates with the valve chamber 170. Therefore, the hydraulic oil can flow between the valve chamber 170 and the main pipeline 422-1 according to a pressure change inside the valve chamber 170 due to the elevation of the spool 300. That is, the damping effect of the spool 300 is generated by the hydraulic fluid flowing between the valve chamber 170 and the auxiliary pipeline 140 according to the pressure change inside the valve chamber 170, thereby stably and precisely controlling the spool 300.

Here, the inner diameter of the pin part orifice 430 may be 0.1 to 0.2 times the inner diameter of the valve chamber 170. In this instance, when the inner diameter of the pin part orifice 430 is less than 0.1 times the inner diameter of the valve chamber 170, reactivity (reaction speed) of the hydraulic valve is reduced. Therefore, for example, if it is applied to an excavator, the working speed of the excavator is reduced. Even though the worker controls the excavator, since a response speed with respect to the corresponding control is slow, an incidence rate of safety accidents, such as collision accidents, is increased. Additionally, time and expenses required for manufacturing the pin part orifice 430 are increased suddenly, and when internal pressure of the valve chamber 170 rises suddenly, the pin part orifice 430 may be damaged. Furthermore, when the inner diameter of the pin part orifice 430 is manufactured to exceed 0.2 times the inner diameter of the valve chamber 170, control stability of the hydraulic valve is reduced so that the worker cannot perform precise control by vibration or the like. In addition, damping performance is reduced since the hydraulic oil in the valve chamber 170 flows into the auxiliary chamber 121 even at a small pressure. Therefore, the inner diameter of the pin part orifice 430 is 0.1 to 0.2 times the inner diameter of the valve chamber 170.

In addition, the valve chamber 170 may have the same shape as the supply chamber 150, and may be formed directly below the supply chamber 150. Since the pin part 420 is coupled to the valve body 100, the valve chamber 170 may have four independent spaces.

As a result, the pin part 420 minimizes vibration or noise of the working machine due to the sudden descent of the spool 300, thereby enabling more precise control. In addition, the spool 300 can perform the damping action through processing of the pin part 420, thereby minimizing the amount of chips generated while processing the inside of the valve body 100, and minimizing accumulation of chips inside the valve body 100. Additionally, since the valve chamber 170 can be integrally processed, the present invention can reduce time and expenses required for processing the inside of the valve body 100.

Hereinafter, a hydraulic pilot valve according to a third embodiment of the present invention will be described in detail with reference to the accompanying drawings. In the present embodiment, there is a difference in that a pin part 420 is provided in comparison with the first embodiment. In the third embodiment, with respect to parts duplicated to the first embodiment, the description of the first embodiment is cited.

Referring to FIGS. 4 to 6, the damping unit 400 includes a pin part 420 provided at the lower part of the bush 200. The pin part 420 includes a pin main body 421, a pin pipeline 422 formed in the pin main body 421 to communicate with the central pipeline 120, and a closing member 423 provided at the lower part of the pin main body 421 to close an end of the central pipeline 120.

More specifically, the pin main body 421 is formed to extend from the lower part of the bush 200 provided to surround the central pipeline 120, and is manufactured to have a diameter larger than the diameter of the bush 200. That is, the pin main body 421 is integrally provided with the bush 200 so that the pin main body 421 is inserted into the valve body 100, thereby serving as the bush 200. In addition, the pin main body 421 is hollow, and the pin pipeline 422 is formed therein. In other words, the pin pipeline 422 communicates with the hollow pipeline 120, and is formed along the longitudinal direction of the valve body 100 from the upper side of the pin main body 421 to the center part of the pin pipeline 422. The closing member 423 extends from the lower part of the pin main body 421 to the bottom surface of the valve body 100. When the pin part 420 is fastened to the valve body 100 via a screw or the like after being inserted into the central pipeline 120, the closing member 423 closes the lower end portion of the central pipeline 120. In other words, the pin part 420 is coupled to the valve body 100 in the state in which the bottom surface of the closing member 423 is parallel to the bottom surface of the valve body 100.

Moreover, the pin pipeline 422 includes a main pipeline 422-1 formed in the longitudinal direction of the pin main body 421, and at least one subsidiary pipeline 422-2 formed to communicate with the main pipeline 422-1. The pin main body 421 includes a groove 421-1 formed along the external circumferential surface of the pin main body 421, and the groove 421-1 communicates the valve chamber 170.

More specifically, the main pipeline 422-1 communicates with the central pipeline 120, is parallel to the central pipeline 120, and is formed in the longitudinal direction of the valve body 100 from the upper side of the pin main body 421 to the center part of the pin pipeline 422. Furthermore, the subsidiary pipeline 422-2 communicates with the main pipeline 422-1, and is formed in four directions from the lower end of the main pipeline 422-1 in a direction perpendicular to the main pipeline 422-1. In this instance, at least one among the four subsidiary pipelines 422-2 is communicated with the auxiliary pipeline 140. Additionally, the four subsidiary pipelines 422-2 are formed on the same line as the auxiliary pipeline 140, and are radially formed around the main pipeline 422-1.

In addition, the groove 421-1 is formed along the outer circumferential surface of the pin main body 421 at the central part of the pin main body 421. In this instance, the groove 421-1 is formed on the subsidiary pipeline 422-2. Therefore, by the groove 421-1, the valve chamber 170 communicates with the subsidiary pipeline 422-2 so that the hydraulic oil can flow between the valve chamber 170 and the subsidiary pipeline 422-2 according to the pressure change inside the valve chamber 170 due to the elevation of the spool 300. That is, the damping effect on the spool 300 is generated by the hydraulic oil flowing between the valve chamber 170 and the auxiliary pipeline 140 according to the pressure change inside the valve chamber 170, thereby providing stable and precise control. Moreover, at least some of the hydraulic oil flowing from the return chamber 110 to the central pipeline 120 flows to the groove 421-1, and the groove 421-1 can maintain the state in which the hydraulic oil is stored.

Additionally, the valve chamber 170 can be formed directly below the supply chamber 150 in the same shape as the supply chamber 150, and the valve chamber 170 can form four independent spaces as the pin part 420 is fastened to the valve body 100.

As a result, the pin part 420 minimizes vibration or noise generated from the working machine due to the sudden descent of the spool 300, thereby enabling more precise control, and the groove 421-1 can always store hydraulic oil required for the damping effect. In addition, since the valve chamber 170 can be integrally processed, it can reduce time and expenses required for processing the inside of the valve body 100. Furthermore, the damping action of the spool 300 can be performed through processing with respect to the pin part 420, thereby minimizing the amount of chips generated by processing the inside of the valve body 100, and minimizing an accumulated amount of chips inside the valve body 100.

More specifically, when the worker lowers at least one of the four spools 300 by manipulating the lever 10, the spool hole 310 corresponding to the lowered spool 300 communicates with the supply chamber 150. Moreover, the hydraulic oil is supplied to the working machine through the actuator port 311 corresponding to the spool hole 310 after passing through the spool hole 310 due to the operation of the pump. At the same time, in the working machine corresponding to the undescended spool 300 among the four spools 300, through the corresponding actuator port 311, the hydraulic oil is introduced into the return chamber 110 through the corresponding spool hole 310, and then, flows to the storage tank. In such a process, the damping unit 400 minimizes generation of vibration or noise of the working machine due to the sudden descending of the spool 300, thereby enabling more precise control and reducing risks of safety accidents. In addition, the auxiliary pipeline 140 is formed to communicate with the return chamber 110 and the return port 111 so as to facilitate the flow of the hydraulic oil, thereby minimizing malfunction by foreign substances such as worn residues.

As described above, it will be appreciated by those skilled in the art that the present invention can be practiced in other specific forms without changing the technical spirit or essential features of the invention.

Therefore, it is to be understood that the embodiments described above are exemplary and not restrictive in all respects, and the scope of the present invention is defined by the appended claims rather than the detailed description, and all changes or modifications derived from the meaning and range of the claims and their equivalent concepts should be interpreted as being included in the scope of the present invention. In addition, the embodiments can be applied by being mixed.

What is claimed is:

1. A hydraulic pilot valve comprising:
   a valve body;
   a return chamber formed inside the valve body;
   a central pipeline extended from the lower part of the return chamber to the bottom surface of the valve body;
   a return port formed on one side of the bottom surface of the valve body;
   an auxiliary pipeline extended from the lower side of the central pipeline to the return port;
   a supply chamber which is formed in the lower part of the return chamber and has a space in which hydraulic oil is stored;
   a supply port formed on the other side of the bottom surface of the valve body;
   a bush mounted to surround at least a part of the central pipeline;
   at least one spool which is inserted into the valve body to be lifted up and down and to control a flow of the hydraulic oil;
   at least one spool hole into which the spool is inserted to form a space for guiding elevation of the spool, which communicates with the return chamber, and which is communicated with or blocked from the supply chamber by the elevation of the spool;
   at least one valve chamber communicating with the spool hole and formed at the lower part of the spool hole; and
   a damping unit formed on one side of the valve chamber to communicate an area of the valve chamber and the central pipeline with each other,
   wherein at least some of the hydraulic oil supplied to the supply chamber flows to the valve chamber or the central pipeline through the damping unit according to the elevation of the spool.

2. The hydraulic pilot valve according to claim 1, wherein the central pipeline includes an auxiliary chamber which is formed in the lower part of the central pipeline and communicates with the central pipeline and the auxiliary pipeline, and wherein the damping unit includes at least one valve orifice communicating the auxiliary chamber and the valve chamber with each other.

3. The hydraulic pilot valve according to claim 1, wherein the damping unit includes a pin part provided at a lower part of the bush, and wherein the pin part includes: a pin main body; a pin pipeline formed inside the pin main body to communicate with the central pipeline; and a closing member provided at a lower part of the pin main body to close an end of the central pipeline.

4. The hydraulic pilot valve according to claim 3, wherein the pin pipeline includes: a main pipeline formed in the longitudinal direction of the pin main body; and a subsidiary pipeline formed to communicate with the main pipeline, wherein the subsidiary pipeline communicates with the auxiliary pipeline, and wherein the damping unit includes at least one pin orifice communicating the valve chamber with the main pipeline.

5. The hydraulic pilot valve according to claim 3, wherein the pin pipeline includes:
   a main pipeline formed in the longitudinal direction of the pin main body; and
   at least one subsidiary pipeline formed to communicate with the main pipeline,
   wherein the subsidiary pipeline communicates with the auxiliary pipeline,
   wherein the pin main body includes a groove formed along the outer circumferential surface of the pin main body, and
   wherein the groove communicates with the valve chamber.

* * * * *